(12) United States Patent
Jin

(10) Patent No.: US 10,877,512 B2
(45) Date of Patent: Dec. 29, 2020

(54) AUDIO DATA TRANSMISSION METHOD AND APPARATUS

(71) Applicant: BEIJING XIAOMI MOBILE SOFTWARE CO., LTD., Beijing (CN)

(72) Inventor: Tao Jin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/577,786

(22) Filed: Sep. 20, 2019

(65) Prior Publication Data

US 2020/0319664 A1 Oct. 8, 2020

(30) Foreign Application Priority Data

Apr. 2, 2019 (CN) .......................... 2019 1 0262427

(51) Int. Cl.
*G06F 1/08* (2006.01)
*H04L 7/00* (2006.01)
(Continued)

(52) U.S. Cl.
CPC .............. *G06F 1/08* (2013.01); *G10L 19/113* (2013.01); *H04B 14/04* (2013.01); *H04L 7/0087* (2013.01)

(58) Field of Classification Search
CPC ... H04B 1/02; H04B 1/04; H04B 1/06; H04B 1/1081; H04B 1/16; H04B 1/1646;
(Continued)

(56) References Cited

U.S. PATENT DOCUMENTS 6,243,032 B1 * 6/2001 Uramoto .......... G11B 20/00007
341/110
2001/0046241 A1 11/2001 Shimosakoda
(Continued)

FOREIGN PATENT DOCUMENTS

CN 1702737 A 11/2005
CN 105611402 A 5/2016
(Continued)

OTHER PUBLICATIONS

Extended European Search Report in the European Application No. 19199969.7, dated Apr. 15, 2020, (8p).
(Continued)

*Primary Examiner* — Young T. Tse
(74) *Attorney, Agent, or Firm* — Arch & Lake LLP

(57) ABSTRACT

The present disclosure relates to an audio data transmission method and apparatus. The method includes: determining a frequency of sampling of audio data to be processed as a clock frequency of a first clock signal; determining a clock frequency of a second clock signal according to the clock frequency of the first clock signal, a number of slots of the audio data to be processed and a preset audio data occupied bit width; determining a duration of a high level in each cycle of the first clock signal according to the clock frequency of the second clock signal and the number of slots; and outputting the processed audio data according to a pulse code modulation (PCM) timing determined by the clock frequency of the first clock signal, the clock frequency of the second clock signal and the duration of the high level in each cycle of the first clock signal.

20 Claims, 13 Drawing Sheets

(51) Int. Cl.
*G10L 19/113* (2013.01)
*H04B 14/04* (2006.01)

(58) Field of Classification Search
CPC .... H04B 1/1661; H04B 14/026; H04B 14/04;
H04L 7/00; H04L 7/0079; H04L 7/0087;
H04L 7/0091; G06F 1/06; G06F 1/08;
G06F 1/10; G10F 19/113
USPC ....... 375/241, 242, 254, 295, 296, 316, 346,
375/355, 364; 329/331, 319; 332/107,
332/112, 123; 381/94.1, 111; 455/63.1,
455/114.2, 114.3, 295, 296
See application file for complete search history.

(56) References Cited

U.S. PATENT DOCUMENTS

| | | | |
|---|---|---|---|
| 2003/0177272 A1 | 9/2003 | Shimosakoda | |
| 2004/0161040 A1* | 8/2004 | Schreiber | G06F 3/162 |
| | | | 375/242 |
| 2004/0213350 A1* | 10/2004 | Frith | H04B 14/04 |
| | | | 375/242 |
| 2006/0247810 A1* | 11/2006 | Risbo | H03F 3/217 |
| | | | 700/94 |
| 2014/0244884 A1* | 8/2014 | Segev | G06F 13/36 |
| | | | 710/305 |

FOREIGN PATENT DOCUMENTS

| | | |
|---|---|---|
| CN | 207732909 U | 8/2018 |
| DE | 4107592 C1 | 6/1992 |
| FR | 2950174 A1 | 3/2011 |
| JP | H11355234 A | 12/1999 |
| KR | 20080004097 A | 1/2008 |

OTHER PUBLICATIONS

NEMO Bluetooh Radio Module Data Sheet, Unigen Solutions for a Real Time World, Unigen Corporation Wireless Module Products, NEMO Bluetooth Radio Modules UGWC621RSMA133, Aug. 18, 2009, (51p).

* cited by examiner

US 10,877,512 B2

AUDIO DATA TRANSMISSION METHOD AND APPARATUS

CROSS-REFERENCE TO RELATED APPLICATION

This application is based upon and claims priority to Chinese Patent Application No. 201910262427.1, filed on Apr. 2, 2019, the contents of which are hereby incorporated by reference in its entirety.

TECHNICAL FIELD

The present disclosure generally relates to the technical field of communications, and more particularly, to an audio data transmission method and apparatus.

BACKGROUND

In the process of audio data transmission based on pulse code modulation (PCM), the requirements for a sending device and a receiving device of audio data are high. The sending device and the receiving device need to have fully matched audio data parameters, such as a frequency of sampling and a number of slots, to ensure the successful transmission of audio data. Otherwise, audio data transmission errors may occur, and parsed audios may contain noise.

SUMMARY

According to a first aspect of the present disclosure, an audio data transmission method is provided. The method may be applied to a sending device. The method may include: parsing input audio data to be processed, and obtaining, for the audio data to be processed, a frequency of sampling, a number of slots and an original bit width of audio data of each slot; determining the frequency of sampling as a clock frequency of a first clock signal; determining a clock frequency of a second clock signal according to the clock frequency of the first clock signal, the number of slots and a preset audio data occupied bit width; determining a duration of a high level in each cycle of the first clock signal according to the clock frequency of the second clock signal and the number of slots; and outputting processed audio data according to a PCM timing determined by the clock frequency of the first clock signal, the clock frequency of the second clock signal and the duration of the high level in each cycle of the first clock signal.

According to a second aspect of the present disclosure, an audio data transmission method is provided. The method may be applied to a receiving device. The method may include: receiving processed audio data, and determining a PCM timing of the processed audio data, the PCM timing including a clock frequency of a first clock signal, a clock frequency of a second clock signal and a duration of a high level in each cycle of the first clock signal; determining a frequency of sampling according to the clock frequency of the first clock signal; determining a number of slots according to the clock frequency of the second clock signal and the duration of the high level in each cycle of the first clock signal; and obtaining audio data having a preset audio preset audio data occupied bit width for each slot from the processed audio data according to the number of slots and the preset audio data occupied bit width.

According to a third aspect of the present disclosure, an audio data transmission apparatus is provided. The apparatus may be applied to a sending device. The apparatus may include: a processor; and a memory configured to store an instruction executable by the processor, herein the processor is configured to: parse input audio data to be processed, and obtain, for the audio data to be processed, a frequency of sampling, a number of slots and an original bit width of audio data of each slot; determine the frequency of sampling as a clock frequency of a first clock signal; determine a clock frequency of a second clock signal according to the clock frequency of the first clock signal, the number of slots and a preset audio data occupied bit width; determine a duration of a high level in each cycle of the first clock signal according to the clock frequency of the second clock signal and the number of slots; and output processed audio data according to a PCM timing determined by the clock frequency of the first clock signal, the clock frequency of the second clock signal and the duration of the high level in each cycle of the first clock signal.

It is to be understood that the above general descriptions and detailed descriptions below are only exemplary and explanatory and 2 not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
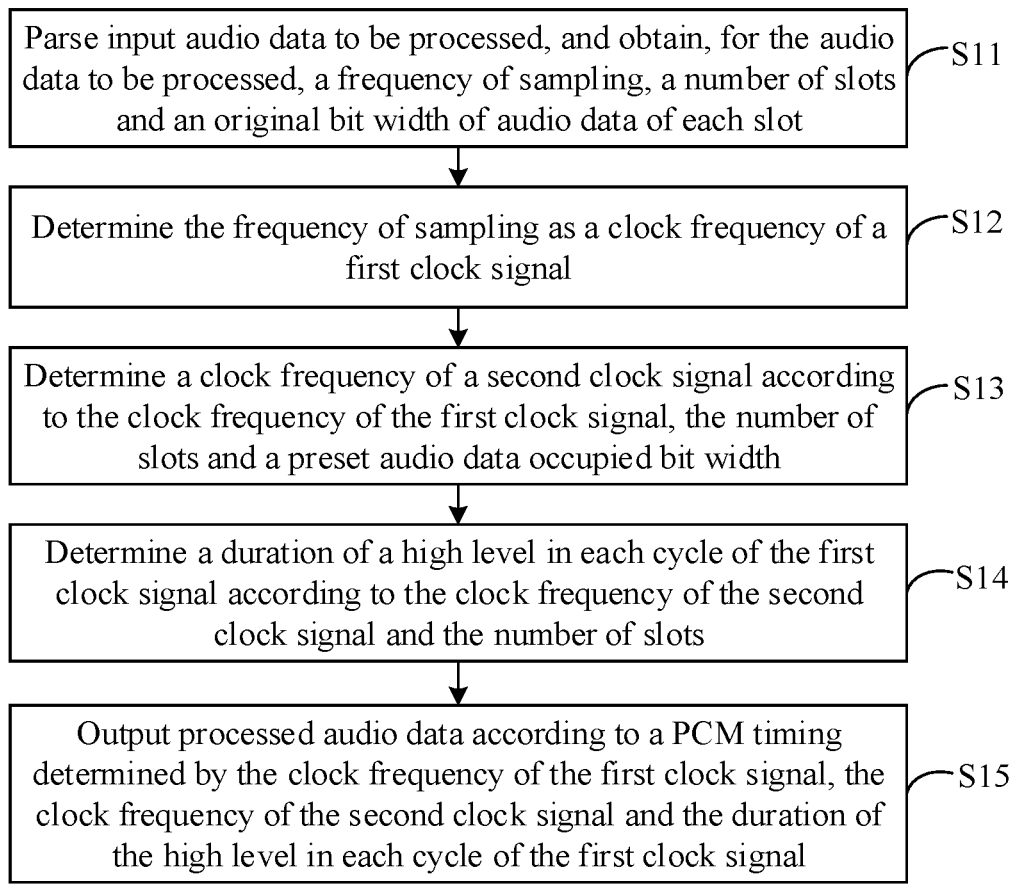
FIG. 1 is a flowchart of an audio data transmission method according to an example.

Reference is made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure.

Instead, they are merely examples of apparatuses and methods consistent with aspects related to the present disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

For ease of understanding, the terms appearing herein are explained below.

PCM (Pulse Code Modulation) in the present disclosure refers to an audio hardware transmission protocol, which involves two clock lines PCMSYN and PCMCLK, and two data lines PCM DIN and PCM DOUT. PCMSYN represents a sampling clock of audio data (i.e., a first clock signal described in the present disclosure), the frequency of the sampling clock representing a frequency of sampling. PCMCLK is a bit synchronous clock (i.e., a second clock signal described in the present disclosure) that transmits a certain amount of information of audio data during its one cycle. In one cycle of PCMSYN, audio data of multiple channels may be transmitted, and the audio data of each channel may be called a slot. PCM DIN represents an audio data input line for receiving audio data input by other devices. PCM DOUT represents an audio data output line for outputting audio data.

Channels may refer to independent audio signals that are captured or played back in different spatial locations during recording or playing, thus a number of channels is a number of sources during sound recording or a corresponding number of speakers during playback. Channels and slots may be used interchangeably in some examples of the disclosure.

A most significant bit (MSB) refers to a bit having the greatest weight in a multi-bit sequence. In contrast, a least significant bit (LSB) refers to a bit having the smallest weight in a multi-bit sequence.

Audio data is a digital representation of sound data. The process of digitizing a sound is actually the process of analog-to-digital conversion of continuous analog audio signals at a certain frequency to obtain audio data. The playing of the digitized sound is to perform digital-to-analog conversion on the audio data to obtain an analog audio signal for output. There are two important indexes when digitizing the sound, namely a frequency of sampling and a size of sampling. The frequency of sampling is a number of sampling within unit time. As the frequency of sampling is larger, an interval between sampling points is smaller, and the digitized sound is more realistic.

Due to the continuous development of devices capable of transmitting audio data, such as mobile phones, when audio data is transmitted between devices, it is necessary to perform matching of audio data transmission protocol parameters in advance to ensure that the protocol parameters between the two devices are identical. Thus, it is ensured that the audio data transmitted between the devices can be prepared for reception without the problem of receiving errors or noises in the played audio after parsing.

FIG. 1 is a flowchart of an audio data transmission method according to an example. As shown in FIG. 1, the method may be applied to a sending device. The sending device may be a device capable of transmitting audio data, such as a mobile phone, a computer, or a music player. The method includes operation S11 to operation S15.

In operation S11, input audio data to be processed is parsed, and a frequency of sampling, a number of slots and an original bit width of audio data of each slot (or audio data of each channel) are obtained for the audio data to be processed.

In the present example, input audio data to be processed may be parsed according to an existing audio data transmission protocol to obtain, for the audio data to be processed, a frequency of sampling, a number of slots and an original bit width of audio data of each slot. The original bit width of the audio data of each slot may be a bit width occupied by all the audio data in the slot, for example, the original bit width may be 8 bits, 16 bits, 24 bits, or the like.

In operation S12, the frequency of sampling is determined as a clock frequency of a first clock signal.

In the present example, the frequency of sampling is determined as the clock frequency of the first clock signal, so that the receiving device may determine the frequency of sampling according to the clock frequency of the first clock signal, thereby implementing the playing of audio data.

In operation S13, a clock frequency of a second clock signal is determined according to the clock frequency of the first clock signal, the number of slots and a preset audio data occupied bit width.

In the present example, a total bit width occupied by the audio data of all slots may be determined according to the number of slots and the preset audio data occupied bit width. A number of cycles of the second clock signal required in each cycle of the first clock signal (i.e., a value obtained by dividing the total bit width by the amount of output information of audio data to be output in each cycle of the first clock signal) is obtained according to the total bit width and the amount of output information of audio data to be output in each cycle of the first clock signal. Further, the clock frequency of the second clock signal is determined according to the clock frequency of the first clock signal and the number of cycles of the second clock signal in each cycle of the first clock signal. The preset audio data occupied bit width may be set in advance according to requirements, and the preset audio data occupied bit width of the audio data of each slot is the same. The preset audio data occupied bit width may be 32 bits or the like. A person skilled in the art can set the preset audio data occupied bit width according to actual needs, which is not limited in the present disclosure.

In operation S14, a duration of a high level in each cycle, or a pulse width, of the first clock signal is determined according to the clock frequency of the second clock signal and the number of slots.

In the present example, the duration of the high level in each cycle of the first clock signal may be equal to the product of the cycle of the second clock signal (e.g. the duration of the cycle of the second clock signal) and the number of slots, so that the receiving device determines the number of slots based on the duration of the high level in each cycle of the first clock signal and the cycle of the second clock signal.

In operation S15, the processed audio data is output according to a PCM timing determined by the clock frequency of the first clock signal, the clock frequency of the second clock signal and the duration of the high level in each cycle of the first clock signal.

In the present example, the processed audio data is output according to the determined PCM timing, thereby ensuring that the receiving device parses the processed audio data according to the clock frequency of the first clock signal, the clock frequency of the second clock signal and the duration of the high level in each cycle of the first clock signal.

The audio data transmission method provided by the examples of the present disclosure is applied to a sending device, and includes: parsing input audio data to be processed, and obtaining, for the audio data to be processed, a frequency of sampling, a number of slots and an original bit width of audio data of each slot; determining the frequency of sampling as a clock frequency of a first clock signal; determining a clock frequency of a second clock signal according to the clock frequency of the first clock signal, the number of slots and a preset audio data occupied bit width; determining a duration of a high level in each cycle of the first clock signal according to the clock frequency of the second clock signal and the number of slots; and outputting the processed audio data according to a PCM timing determined by the clock frequency of the first clock signal, the clock frequency of the second clock signal and the duration of the high level in each cycle of the first clock signal. The requirements for a sending device and a receiving device of audio data are low, audio data transmission between different devices is facilitated, and it is possible to avoid the occurrence of problems such as transmission data errors and audio noise caused by mismatch between parameters of the sending device and the receiving device during the transmission of the audio data.

Figure 2:
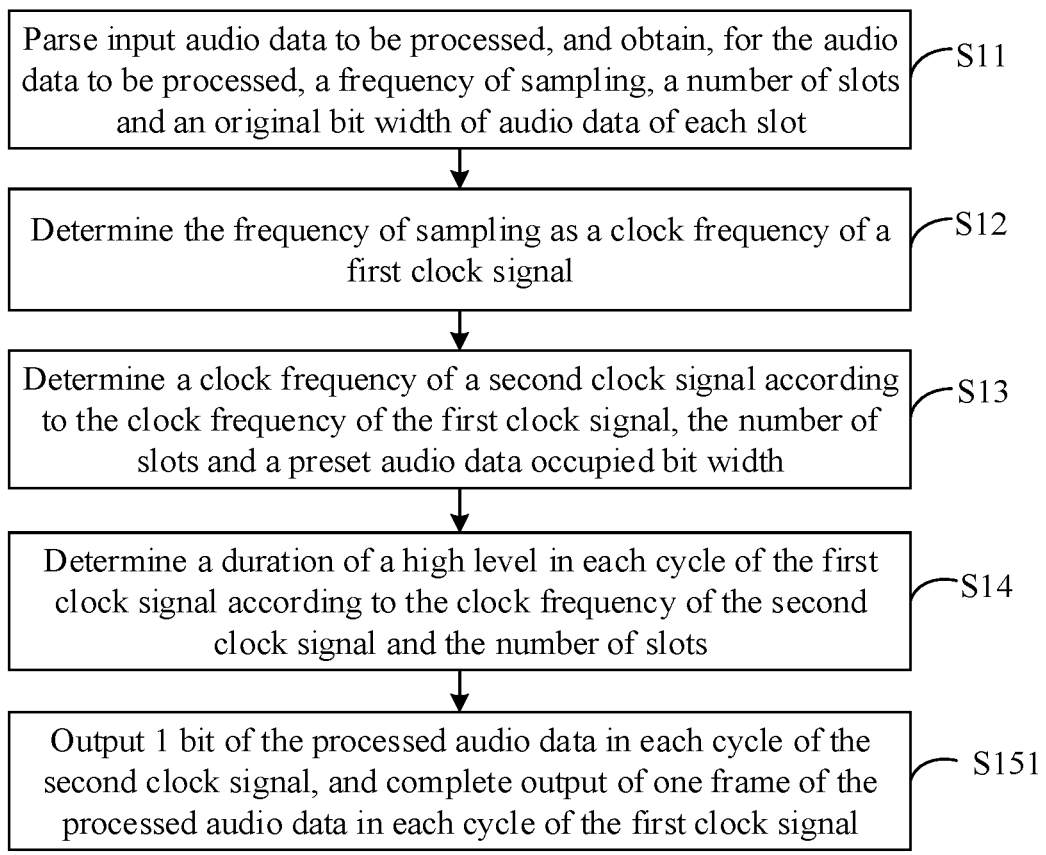
FIG. 2 is a flowchart of an audio data transmission method according to an example.

FIG. 2 is a flowchart of an audio data transmission method according to an example. In a possible implementation, as shown in FIG. 2, operation S15 may include operation S151.

In operation S151, 1 bit of the processed audio data is output in each cycle of the second clock signal, and output of one frame of the processed audio data is completed in each cycle of the first clock signal.

In this implementation, said one frame of the processed audio data includes audio data of all slots that has a preset audio data occupied bit width. The audio data of each slot may be sequentially sent in a preset order.

In this implementation, the amount of information of the processed audio data output in each cycle of the second clock signal may be set to a size of 2 bits or the like, which is not limited in the present disclosure.

Figure 3:
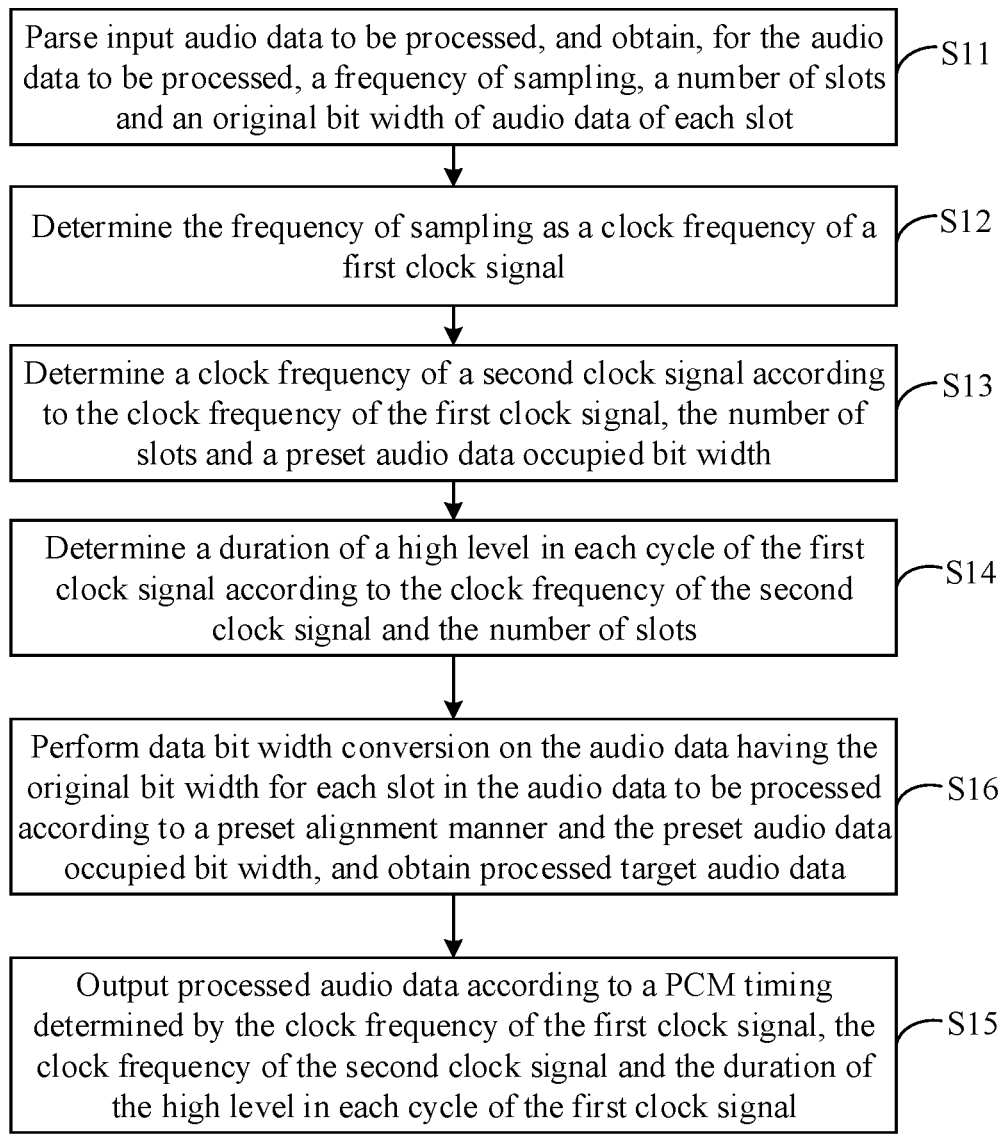
FIG. 3 is a flowchart of an audio data transmission method according to an example.

FIG. 3 is a flowchart of an audio data transmission method according to an example. In a possible implementation, as shown in FIG. 3, the method may include operation S16.

In operation S16, data bit width conversion is performed on the audio data of each slot having the original bit width (or the audio data having the original bit width for each slot) in the audio data to be processed according to a preset alignment manner and the preset audio data occupied bit width, and processed target audio data is obtained.

In this implementation, when the original bit width of the audio data to be processed is different from the preset audio data occupied bit width, the audio data in each slot is converted from the original bit width to the unified preset audio data occupied bit width. In this way, it is convenient for the receiving device to obtain the audio data of each slot from the processed audio data. A preset alignment manner may be set as needed to ensure that the receiving device can read the audio data in each slot according to the preset alignment manner when parsing the processed audio data. For example, the alignment manner may be left-alignment, right-alignment or the like. Operation S16 needs to be performed before operation S15 to ensure that the audio data of each slot in the processed audio data has a preset audio data occupied bit width.

In a possible implementation, operation S16 may include: converting the audio data having the original bit width in each slot into the audio data having the preset audio data occupied bit width using a left-alignment manner. The audio data having the preset audio data occupied bit width sequentially includes, from left to right, valid audio data having the original bit width and complementing data having a remaining bit width, the remaining bit width being equal to a difference between the preset audio data occupied bit width and the original bit width.

In this implementation, the original bit width of the audio data to be processed may be a bit width value of 8 bits, 16 bits, 24 bits, or the like, that is less than or equal to a preset bit width (e.g. the preset audio data occupied bit width). The complementing data may be a preset number and/or character such as 0 or 1. The complementing data is invalid, and audios cannot be characterized by the complementing data. The valid audio data is original audio data in the audio data to be processed.

For example, it is assumed that the audio data to be processed includes audio data in binary representation of one slot, and the original bit width of the audio data is 16 bits. For example, the audio data to be processed is 0110 1101 0101 0101. It is assumed that the preset audio data occupied bit width is 32 bits, the complementing data is 0, and the alignment manner is left-alignment. Then, the processed audio data obtained by performing bit width conversion on data to be processed "0110 1101 0101 0101" is "0110 1101 0101 0101 0000 0000 0000 0000". The first 16 bits 0110 1101 0101 0101 from left to right of "0110 1101 0101 0101 0000 0000 0000 0000" are valid audio data, and the last 16 bits 0000 0000 0000 0000 are complementing data.

In a possible implementation, the data type and alignment manner of the processed audio data may be preset. For example, the processed audio data may be preset to signed data, unsigned data, etc., and the alignment manner is left-alignment. A uniform data type is set for the processed audio data, so it is ensured that the receiving device can accurately parse the processed audio data. A person skilled in the art can set a data type for the processed audio data according to actual needs, which is not limited in the present disclosure.

In a possible implementation, audio data transmission may be performed according to the alignment manner of the processed audio data. For example, if the alignment manner is left-alignment, the processed audio data may be sequentially transmitted to the receiving device in the order from left to right.

Figure 4:
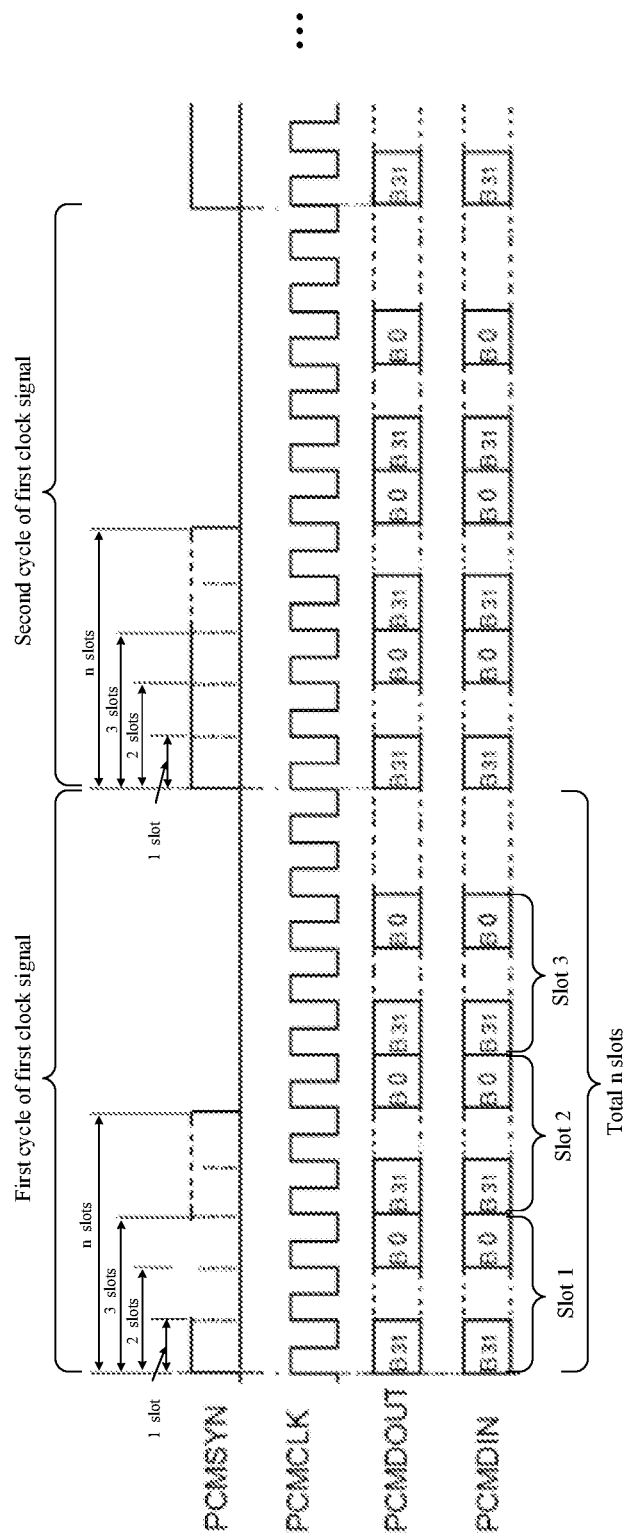
FIG. 4 is a timing diagram of processed audio data in another audio data transmission method according to an example.

For example, FIG. 4 is a timing diagram of processed audio data in an audio data transmission method according to an example. As shown in FIG. 4, it is assumed that the processed audio data includes audio data of n slots, and the preset audio data occupied bit width of the audio data of each slot is 32 bits. The ratio of the duration of the high level in each cycle of the first clock signal PCMSYN to the cycle of the second clock signal PCMCLK is the number of slots. In one cycle of each second clock signal, 1 bit of audio data is transmitted between the sending device and the receiving device, and the transmission of one frame of processed audio data is completed in one cycle of the first clock signal. The transmission of 1 bit of audio data between the sending device and the receiving device may include that the sending device sends the processed audio data to the receiving device through a sending data line PCMDOUT, and the receiving device receives the processed audio data from the sending device through a receiving data line PCMDIN.

If the processed audio data is left-aligned signed data, data B31 in the audio data of each slot is symbol bit data, and data B30, ..., data B0 are numerical bit data, where the data B30 is MSB data in the numerical bit data. If the processed audio data is left-aligned unsigned data, data B31, ..., data B0 in the audio data of each slot are numerical bit data, where the data B31 is MSB data in the numerical bit data.

The sending device sends target audio data to the receiving device according to the left-alignment manner. For audio data after each frame processing, the sending device sequentially sends data B31, data B30, ..., data B0 of the first slot, data B31, data B30, ..., data B0 of the second slot, ... until data B31, data B30, ..., data B0 of the $n^{th}$ slot in a certain cycle of the first clock signal corresponding to the audio data after this frame processing.

Figure 5:
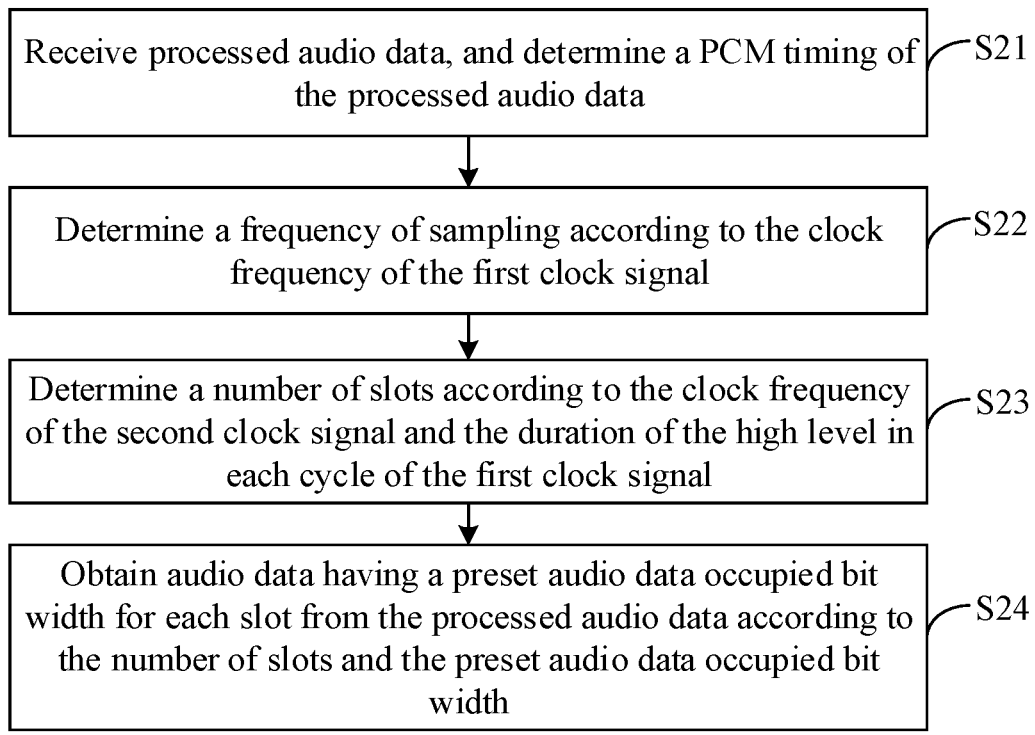
FIG. 5 is a flowchart of another audio data transmission method according to an example.

FIG. 5 is a flowchart of another audio data transmission method according to an example. As shown in FIG. 5, the method may be applied to a receiving device. The receiving device is configured to receive target audio data (e.g. the processed audio data) sent by the sending device. The receiving device may be a device capable of transmitting audio data, such as a mobile phone, a computer, or a music player. The method includes operation S21 to operation S24.

In operation S21, processed audio data is received, and a PCM timing of the processed audio data is determined, the PCM timing including a clock frequency of a first clock signal, a clock frequency of a second clock signal and a duration of a high level in each cycle of the first clock signal.

In the present example, during the process of receiving the processed audio data, a clock frequency of a first clock signal, a clock frequency of a second clock signal and a duration of a high level in each cycle of the first clock signal may be determined.

In operation S22, a frequency of sampling is determined according to the clock frequency of the first clock signal.

In the present example, the clock frequency of the first clock signal may be determined as the frequency of sampling, so that in the process of playing the processed audio data, digital-to-analog conversion will be performed according to the frequency of sampling to play audios for a user.

In operation S23, a number of slots is determined according to the clock frequency of the second clock signal and the duration of the high level in each cycle of the first clock signal.

In the present example, the cycle of the second clock signal may be determined according to the clock frequency of the second clock signal, and a result obtained by dividing the duration of the high level in each cycle of the first clock signal by the cycle of the second clock signal is determined as the number of slots.

In operation S24, audio data having a preset audio data occupied bit width for each slot (i.e. audio data of each slot having a preset audio data occupied bit width) is obtained from the processed audio data according to the number of slots and the preset audio data occupied bit width.

In the present example, audio data having a preset audio data occupied bit width for each slot (quantity of slots corresponding to number of slots) may be obtained from the processed audio data according to the number of slots and the preset audio data occupied bit width. After the receiving device acquires the audio data of each slot, the audio data of each slot can be played according to the indication, so that the user can listen to the content of the processed audio data.

The audio data transmission method provided by the examples of the present disclosure is applied to a receiving device, and includes: receiving processed audio data, and determining a PCM timing of the processed audio data, the PCM timing including a clock frequency of a first clock signal, a clock frequency of a second clock signal and a duration of a high level in each cycle of the first clock signal; determining a frequency of sampling according to the clock frequency of the first clock signal; determining a number of slots according to the clock frequency of the second clock signal and the duration of the high level in each cycle of the first clock signal; and obtaining audio data having a preset audio data occupied bit width for each slot from the processed audio data according to the number of slots and the preset audio data occupied bit width. The requirements for a sending device and a receiving device of audio data are low, audio data transmission between different devices is facilitated, and it is possible to avoid the occurrence of problems such as transmission data errors and audio noise caused by mismatch between parameters of the sending device and the receiving device during the transmission of the audio data.

Figure 6:
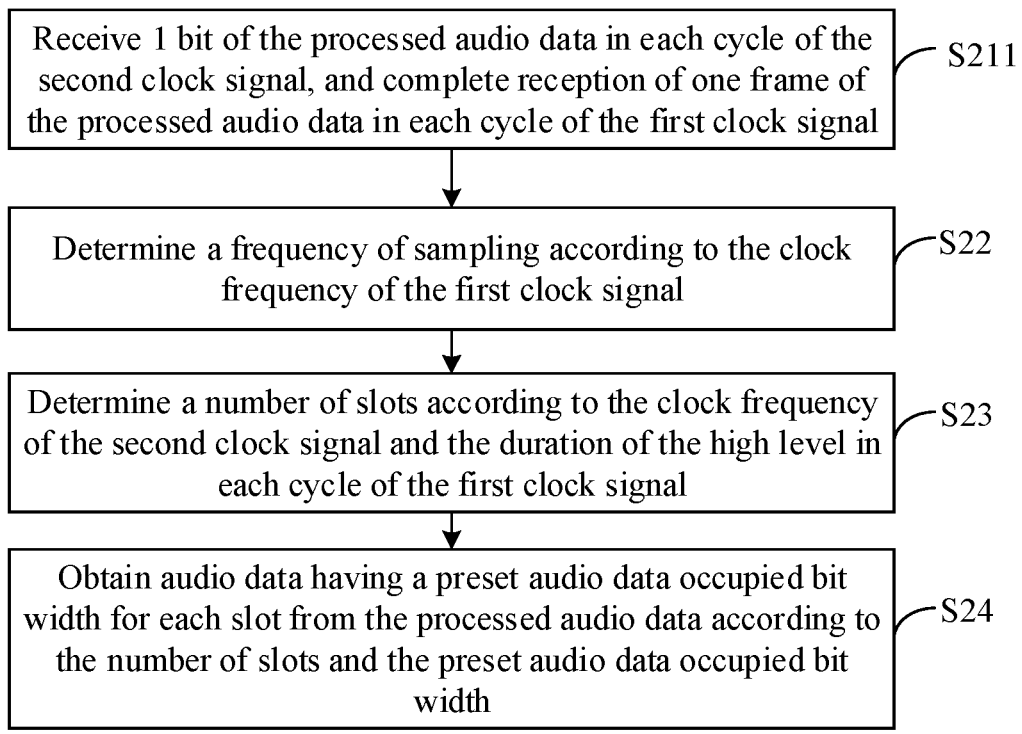
FIG. 6 is a flowchart of another audio data transmission method according to an example.

FIG. 6 is a flowchart of another audio data transmission method according to an example. In a possible implementation, as shown in FIG. 6, operation S21 may include operation S211.

In operation S211, 1 bit of the processed audio data is received in each cycle of the second clock signal, and reception of one frame of the processed audio data is completed in each cycle of the first clock signal.

In the implementation, the cycle of the first clock signal may be determined according to a duration of the received one frame of the processed audio data, thereby determining the clock frequency thereof. And, the clock frequency of the second clock signal may be determined according to the cycle of the first clock signal and the number of bits of the processed audio data received in each cycle of the first clock signal. Moreover, the transmission of the processed audio data according to the method can improve the accuracy of audio data transmission and reduce the error rate.

Figure 7:
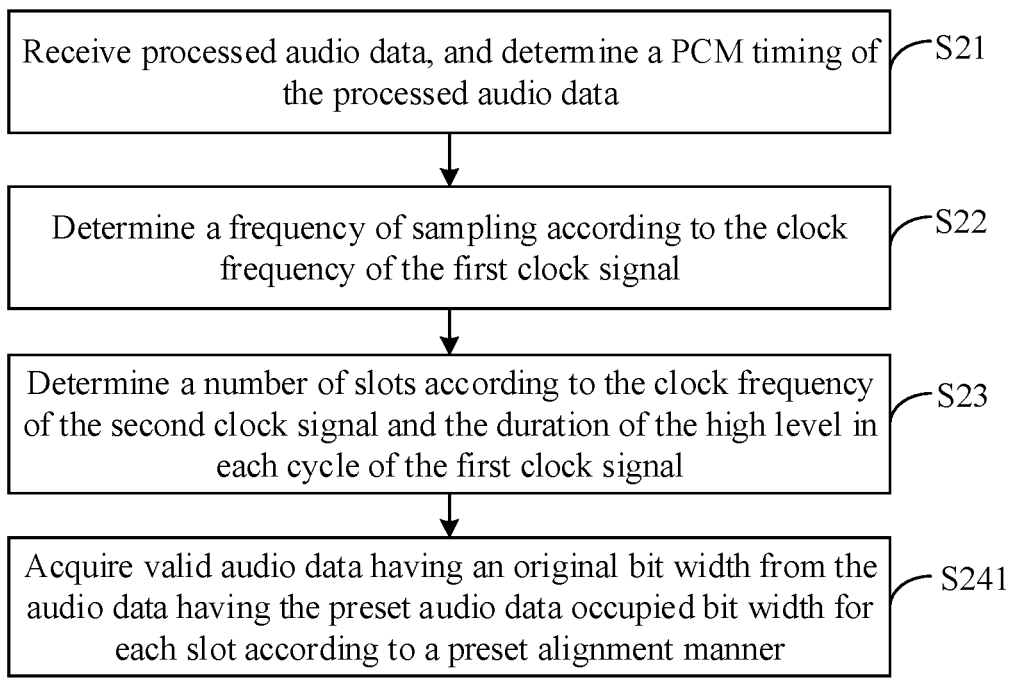
FIG. 7 is a flowchart of an audio data transmission method according to an example.

FIG. 7 is a flowchart of another audio data transmission method according to an example. In a possible implementation, as shown in FIG. 7, operation S24 may include operation S241.

In operation S241, valid audio data having the original bit width is acquired from the audio data having the preset audio data occupied bit width for each slot according to a preset alignment manner.

In a possible implementation, the alignment manner may include a left-alignment manner. The audio data having the preset audio data occupied bit width sequentially includes, from left to right, valid audio data having the original bit width and complementing data having a remaining bit width, the remaining bit width being equal to a difference between the preset audio data occupied bit width and the original bit width.

In this implementation, the preset alignment manner may be left-alignment, right-alignment or the like. The receiving device may obtain valid audio data having the original bit width of the slot from the audio data having the preset audio data occupied bit width for each slot in a preset alignment manner according to possible values (such as 8 bits, 16 bits or 24 bits) of the known original bit width and the complementing number of the complementing data.

For example, it is assumed that the complementing data is 0, the preset audio data occupied bit width is 32 bits, and the preset alignment manner is left-alignment. Audio data having a preset audio data occupied bit width for a certain slot in the processed audio data is "0110 1101 0101 0101 0000 0000 0000 0000". Then, the receiving device may sequentially read "0110 1101 0101 0101 0000 0000 0000 0000" from left to right. Since the complementing data is 0, it can be determined that the first 16 bits "0110 1101 0101 0101" are the valid audio data having the original bit width, and the last 16 bits "0000 0000 0000 0000" are the complementing data.

Figure 8:
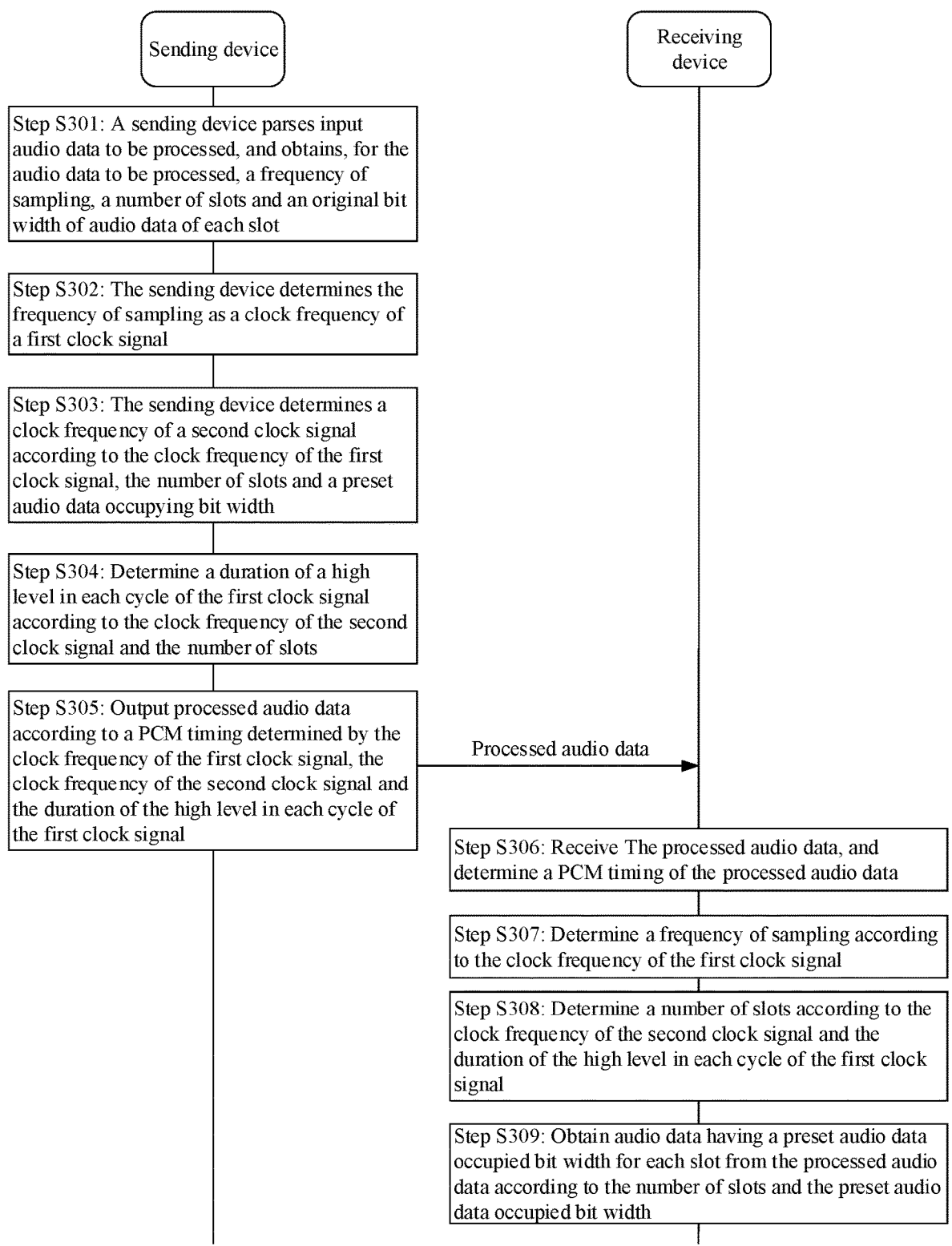
FIG. 8 is a schematic flowchart of an audio data transmission method according to an example.

FIG. 8 is a schematic flowchart of an audio data transmission method according to an example. As shown in FIG. 8, the process of transmitting audio data by a sending device and a receiving device includes operations S301 to S309.

In operation S301, a sending device parses input audio data to be processed, and obtains, for the audio data to be processed, a frequency of sampling, a number of slots and an original bit width of audio data of each slot.

In operation S302, the sending device determines the frequency of sampling as a clock frequency of a first clock signal.

In operation S303, the sending device determines a clock frequency of a second clock signal according to the clock frequency of the first clock signal, the number of slots and a preset audio data occupied bit width.

In operation S304, a duration of a high level in each cycle of the first clock signal is determined according to the clock frequency of the second clock signal and the number of slots.

In operation S305, the processed audio data is output according to a PCM timing determined by the clock frequency of the first clock signal, the clock frequency of the second clock signal and the duration of the high level in each cycle of the first clock signal. 1 bit of the processed audio data is output in each cycle of the second clock signal, and output of one frame of the processed audio data is completed in each cycle of the first clock signal.

Moreover, when the original bit width of the audio data to be processed is different from the preset audio data occupied bit width, before S305, the sending device performs data bit width conversion on the audio data having the original bit width for each slot in the audio data to be processed according to a preset alignment manner (such as left-alignment) and the preset audio data occupied bit width to obtain processed target audio data.

In operation S306, the processed audio data is received, and a PCM timing of the processed audio data is determined, the PCM timing including a clock frequency of a first clock signal, a clock frequency of a second clock signal and a duration of a high level in each cycle of the first clock signal. 1 bit of the processed audio data is received in each cycle of the second clock signal, and reception of one frame of the processed audio data is completed in each cycle of the first clock signal.

In operation S307, a frequency of sampling is determined according to the clock frequency of the first clock signal.

In operation S308, a number of slots is determined according to the clock frequency of the second clock signal and the duration of the high level in each cycle of the first clock signal.

In operation S309, audio data having a preset audio data occupied bit width for each slot is obtained from the processed audio data according to the number of slots and the preset audio data occupied bit width. Valid audio data having the original bit width is acquired from the audio data having the preset audio data occupied bit width for each slot according to a preset alignment manner.

Operations S301 to S305 refer to the related description of the audio data transmission method applied to the sending device, operations S306 to S309 refer to the related description of the audio data transmission method applied to the receiving device, and details are not described herein again.

Figure 9A:
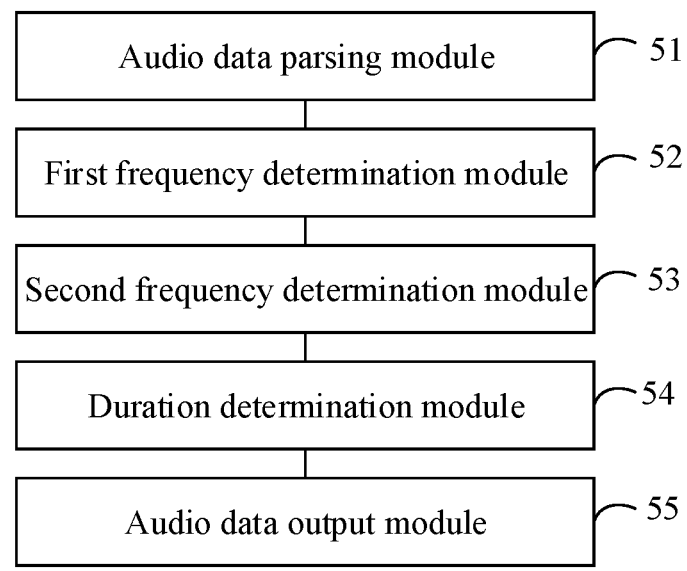
FIG. 9A is a block diagram of an audio data transmission apparatus according to an example.
Figure 9B:
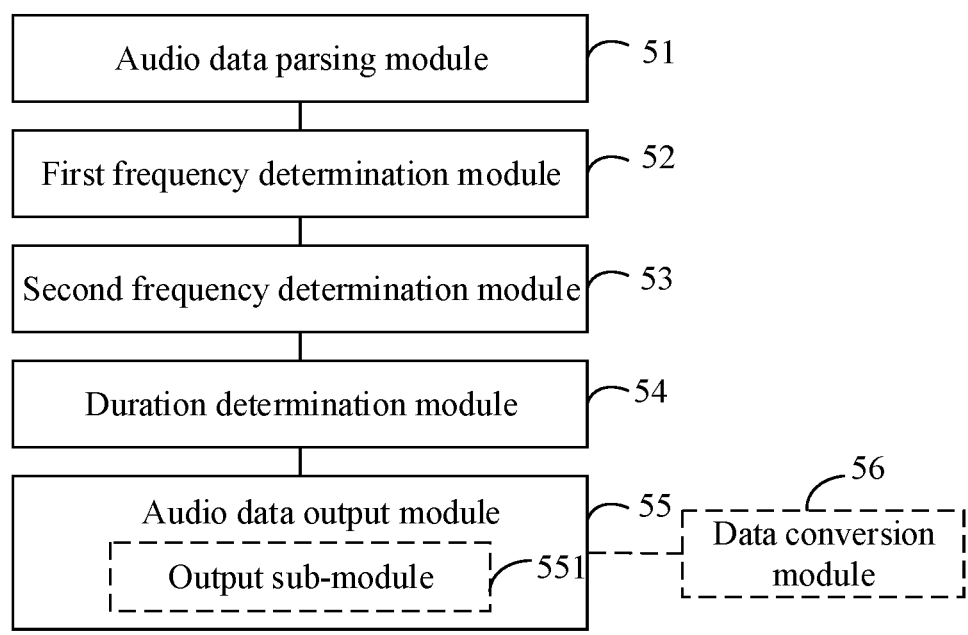
FIG. 9B is a block diagram of an audio data transmission apparatus according to another example.

FIG. 9a and FIG. 9b are a block diagram of an audio data transmission apparatus according to an example, respectively. As shown in FIG. 9, the apparatus may be applied to a sending device. The sending device may be a device capable of transmitting audio data, such as a mobile phone, a computer, or a music player. The apparatus includes an audio data parsing module 51, a first frequency determination module 52, a second frequency determination module 53, a duration determination module 54, and an audio data output module 55.

The audio data parsing module 51 is configured to parse input audio data to be processed, and obtain, for the audio data to be processed, a frequency of sampling, a number of slots and an original bit width of audio data of each slot.

The first frequency determination module 52 is configured to determine the frequency of sampling as a clock frequency of a first clock signal.

The second frequency determination module 53 is configured to determine a clock frequency of a second clock signal according to the clock frequency of the first clock signal, the number of slots and a preset audio data occupied bit width.

The duration determination module 54 is configured to determine a duration of a high level in each cycle of the first clock signal according to the clock frequency of the second clock signal and the number of slots.

The audio data output module 55 is configured to output the processed audio data according to a PCM timing determined by the clock frequency of the first clock signal, the clock frequency of the second clock signal and the duration of the high level in each cycle of the first clock signal.

In a possible implementation, as shown in FIG. 9b, the audio data output module 55 may include an output sub-module 551. The output sub-module 551 is configured to output 1 bit of the processed audio data in each cycle of the second clock signal, and complete output of one frame of the processed audio data in each cycle of the first clock signal.

In a possible implementation, as shown in FIG. 9b, the apparatus may further include a data conversion module 56. The data conversion module 56 is configured to perform data bit width conversion on the audio data having the original bit width for each slot in the audio data to be processed according to a preset alignment manner and the preset audio data occupied bit width, and obtain the processed audio data. The original bit width is less than or equal to the preset audio data occupied bit width.

In a possible implementation, the data conversion module may include a conversion sub-module. The conversion sub-module is configured to convert the audio data having the original bit width in each slot into the audio data having the preset audio data occupied bit width using a left-alignment manner. The audio data having the preset audio data occupied bit width sequentially includes, from left to right, valid audio data having the original bit width and complementing data having a remaining bit width, the remaining bit width being equal to a difference between the preset audio data occupied bit width and the original bit width.

The audio data transmission apparatus provided by the examples of the present disclosure is applied to a sending device. The requirements for the sending device and a receiving device of audio data are low, audio data transmission between different devices is facilitated, and it is possible to avoid the occurrence of problems such as transmission data errors and audio noise caused by mismatch between parameters of the sending device and the receiving device during the transmission of the audio data.

Figure 10A:
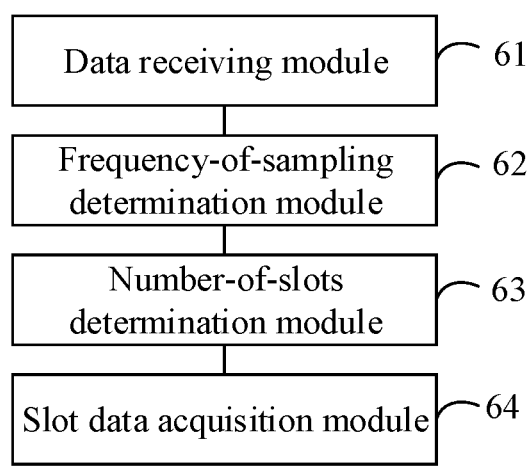
FIG. 10A is a block diagram of an audio data transmission apparatus according to an example.
Figure 10B:
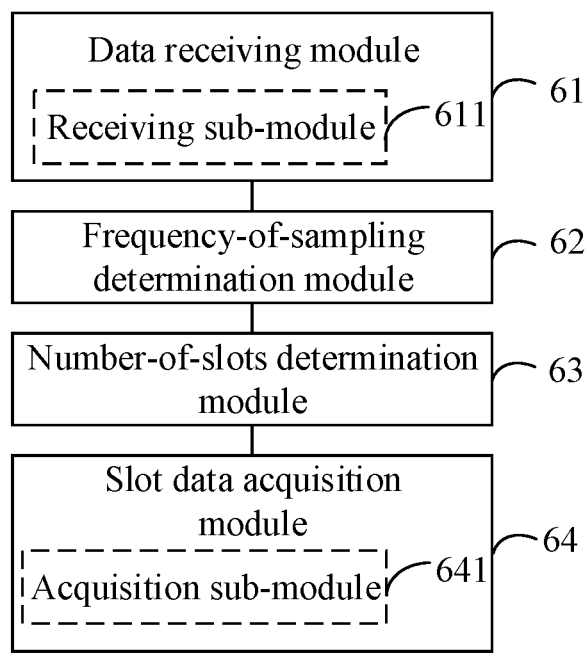
FIG. 10B is a block diagram of an audio data transmission apparatus according to another example.

FIG. 10a and FIG. 10b are a block diagram of an audio data transmission apparatus according to an example, respectively. As shown in FIG. 10a, the apparatus may be applied to a receiving device. The receiving device is configured to receive target audio data sent by the sending device. The receiving device may be a device capable of transmitting audio data, such as a mobile phone, a computer, or a music player. The apparatus includes a data receiving module 61, a frequency-of-sampling determination module 62, a number-of-slots determination module 63, and a slot data acquisition module 64.

The data receiving module 61 is configured to receive processed audio data, and determine a PCM timing of the processed audio data, the PCM timing including a clock frequency of a first clock signal, a clock frequency of a second clock signal and a duration of a high level in each cycle of the first clock signal.

The frequency-of-sampling determination module 62 is configured to determine a frequency of sampling according to the clock frequency of the first clock signal.

The number-of-slots determination module 63 is configured to determine a number of slots according to the clock frequency of the second clock signal and the duration of the high level in each cycle of the first clock signal.

The slot data acquisition module 64 is configured to obtain audio data having a preset audio data occupied bit width for each slot from the processed audio data according to the number of slots and the preset audio data occupied bit width.

In a possible implementation, as shown in FIG. 10b, the data receiving module 61 may include a receiving sub-module 611. The receiving sub-module 611 is configured to receive 1 bit of the processed audio data in each cycle of the second clock signal, and complete reception of one frame of the processed audio data in each cycle of the first clock signal.

In a possible implementation, as shown in FIG. 10b, the slot data acquisition module 64 may include an acquisition sub-module 641. The acquisition sub-module 641 is configured to acquire valid audio data having the original bit width from the audio data having the preset audio data occupied bit width for each slot according to a preset alignment manner.

In a possible implementation, the alignment manner may include a left-alignment manner. The audio data having the preset audio data occupied bit width sequentially includes, from left to right, valid audio data having the original bit width and complementing data having a remaining bit width, the remaining bit width being equal to a difference between the preset audio data occupied bit width and the original bit width.

The audio data transmission apparatus provided by the examples of the present disclosure is applied to a receiving device. The requirements for a sending device and the receiving device of audio data are low, audio data transmission between different devices is facilitated, and it is possible to avoid the occurrence of problems such as transmission data errors and audio noise caused by mismatch between parameters of the sending device and the receiving device during the transmission of the audio data.

With regard to the apparatus in the above examples, the specific manner in which the respective modules perform the operations has been described in detail in the example relating to the method, and will not be explained in detail herein.

Figure 11:
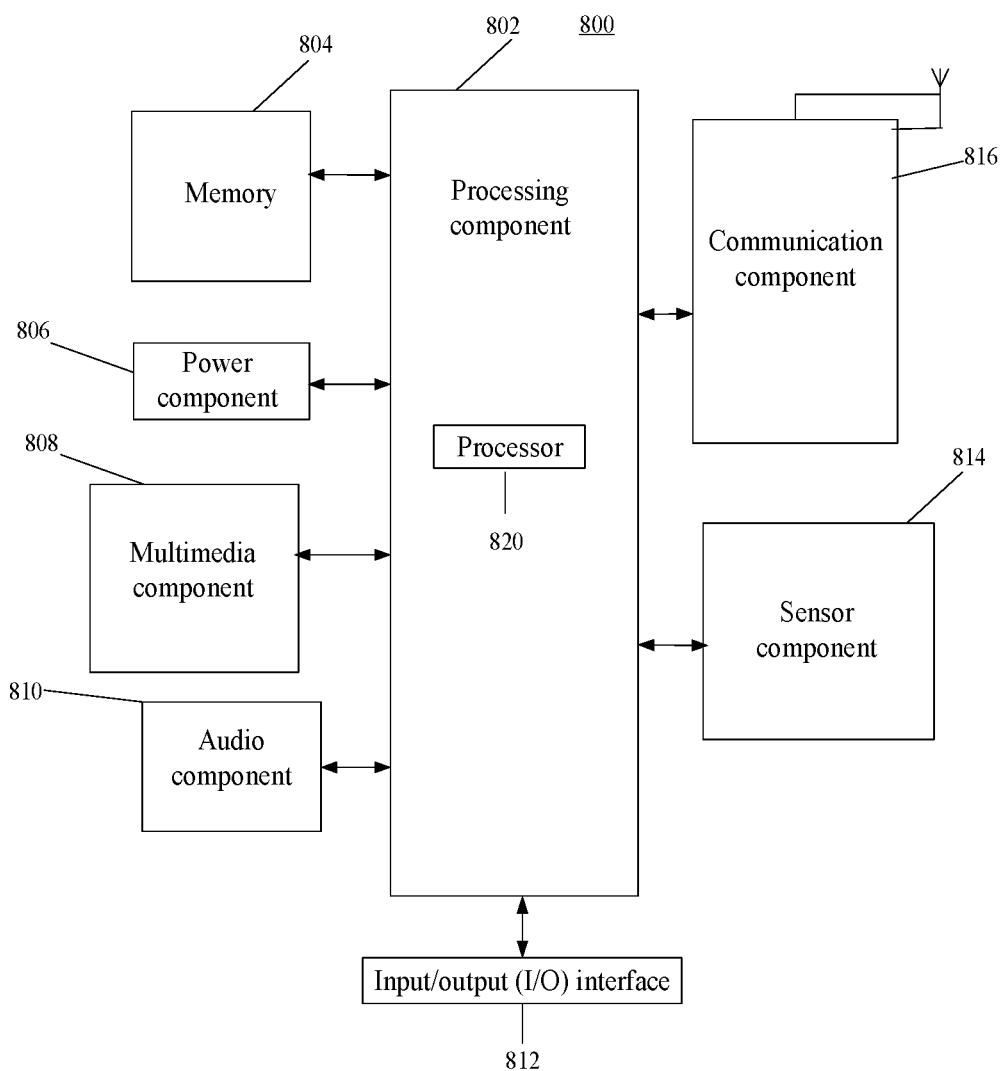
FIG. 11 is a block diagram of an apparatus 800 for audio data transmission according to an example.

FIG. 11 is a block diagram of an apparatus 800 for audio data transmission according to an example. For example, the apparatus 800 may be a mobile phone, a computer, a digital broadcast terminal, a messaging device, a gaming console, a tablet, a medical device, exercise equipment, a personal digital assistant, and the like. The apparatus 800 may be applied to a sending device or a receiving device.

The audio data transmission apparatus provided by the examples of the present disclosure, which is applied to a sending device, includes: a processor; and a memory configured to store an instruction executable by the processor, where the processor is configured to: parse input audio data to be processed, and obtain, for the audio data to be processed, a frequency of sampling, a number of slots and an original bit width of audio data of each slot; determine the frequency of sampling as a clock frequency of a first clock signal; determine a clock frequency of a second clock signal according to the clock frequency of the first clock signal, the number of slots and a preset audio data occupied bit width; determine a duration of a high level in each cycle of the first clock signal according to the clock frequency of the second clock signal and the number of slots; and output processed audio data according to a pulse code modulation (PCM) timing determined by the clock frequency of the first clock signal, the clock frequency of the second clock signal and the duration of the high level in each cycle of the first clock signal.

The audio data transmission apparatus provided by the examples of the present disclosure, which is applied to a receiving device, includes a processor; and a memory configured to store an instruction executable by the processor, where the processor is configured to: receive processed audio data, and determine a pulse code modulation (PCM) timing of the processed audio data, the PCM timing including a clock frequency of a first clock signal, a clock frequency of a second clock signal and a duration of a high level in each cycle of the first clock signal; determine a frequency of sampling according to the clock frequency of the first clock signal; determine a number of slots according to the clock frequency of the second clock signal and the duration of the high level in each cycle of the first clock signal; and obtain audio data having a preset audio data occupied bit width for each slot from the processed audio data according to the number of slots and the preset audio data occupied bit width.

Referring to FIG. 11, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For example, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one example, the communication component 816 receives a broadcast signal or broadcast associated information from an external broadcast management system via a broadcast slot. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer readable storage medium including instructions, such as included in the memory 804, executable by the processor 820 in the apparatus 800, for performing the above-described methods. For example, the non-transitory computer-readable storage medium may be a ROM, a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof

What is claimed is:

1. An audio data transmission method, applied to a sending device, the method comprising:
    parsing input audio data to be processed, and obtaining, for the input audio data to be processed, a frequency of sampling, a number of slots and an original bit width of audio data of each slot;
    determining the frequency of sampling as a clock frequency of a first clock signal;
    determining a clock frequency of a second clock signal according to the clock frequency of the first clock signal, the number of slots and a preset bit width occupied by audio data;
    determining a duration of a high level in each cycle of the first clock signal according to the clock frequency of the second clock signal and the number of slots; and
    outputting processed audio data according to a pulse code modulation (PCM) timing determined by the clock frequency of the first clock signal, the clock frequency of the second clock signal and the duration of the high level in each cycle of the first clock signal.

2. The method of claim 1, wherein outputting the processed audio data according to the PCM timing determined by the clock frequency of the first clock signal, the clock frequency of the second clock signal and the duration of the high level in each cycle of the first clock signal comprises:
    outputting 1 bit of the processed audio data in each cycle of the second clock signal, and completing output of one frame of the processed audio data in each cycle of the first clock signal.

3. The method of claim 1, further comprising:
    performing data bit width conversion on the audio data having the original bit width for each slot in the input audio data to be processed according to a preset alignment manner and the preset bit width, and obtaining the processed audio data,
    wherein the original bit width is less than or equal to the preset bit width.

4. The method of claim 3, wherein performing the data bit width conversion on the audio data having the original bit width for each slot in the input audio data to be processed according to the preset alignment manner and the preset bit width and obtaining the processed audio data comprise:
    converting the audio data having the original bit width in each slot into audio data having the preset bit width using a left-alignment manner,
    wherein the audio data having the preset bit width sequentially comprises, from left to right, valid audio data having the original bit width and complementing data having a remaining bit width, the remaining bit width being equal to a difference between the preset bit width and the original bit width.

5. A non-transitory computer-readable storage medium having stored thereon instructions that, when executed by a processor, cause the processor to perform the audio data transmission method of claim 1.

6. The non-transitory computer-readable storage medium of claim 5, wherein the instructions further cause the processor to output 1 bit of the processed audio data in each cycle of the second clock signal, and complete output of one frame of the processed audio data in each cycle of the first clock signal.

7. An audio data transmission method, applied to a receiving device, the method comprising:
    receiving processed audio data, and determining a pulse code modulation (PCM) timing of the processed audio data, the PCM timing comprising a clock frequency of a first clock signal, a clock frequency of a second clock signal and a duration of a high level in each cycle of the first clock signal;
    determining a frequency of sampling according to the clock frequency of the first clock signal;
    determining a number of slots according to the clock frequency of the second clock signal and the duration of the high level in each cycle of the first clock signal; and
    obtaining audio data having a preset bit width occupied by audio data for each slot from the processed audio data according to the number of slots and the preset bit width.

8. The method of claim 7, wherein receiving the processed audio data and determining the PCM timing of the processed audio data comprise:
    receiving 1 bit of the processed audio data in each cycle of the second clock signal, and completing reception of one frame of the processed audio data in each cycle of the first clock signal.

9. The method of claim 7, wherein obtaining the audio data having the preset bit width for each slot from the processed audio data according to the number of slots and the preset bit width comprises:
    acquiring valid audio data having an original bit width from the audio data having the preset bit width for each slot according to a preset alignment manner.

10. The method of claim 9, wherein the preset alignment manner comprises a left-alignment manner,
    wherein the audio data having the preset bit width sequentially comprises, from left to right, the valid audio data having the original bit width and complementing data having a remaining bit width, the remaining bit width being equal to a difference between the preset bit width and the original bit width.

11. An audio data transmission apparatus, applied to the receiving device, the apparatus comprising:
    a processor; and
    a memory configured to store instructions executable by the processor,
    wherein the processor is configured to perform operations of the audio data transmission method according to claim 7.

12. The apparatus of claim 11, wherein receiving the processed audio data and determining the PCM timing of the processed audio data comprise:
    receiving 1 bit of the processed audio data in each cycle of the second clock signal, and completing reception of one frame of the processed audio data in each cycle of the first clock signal.

13. The apparatus of claim 11, wherein obtaining the audio data having the preset bit width for each slot from the processed audio data according to the number of slots and the preset bit width comprises:
    acquiring valid audio data having an original bit width from the audio data having the preset bit width for each slot according to a preset alignment manner.

14. The apparatus of claim 13, wherein the preset alignment manner comprises a left-alignment manner,
    wherein the audio data having the preset bit width sequentially comprises, from left to right, the valid audio data having the original bit width and complementing data having a remaining bit width, the remaining bit width being equal to a difference between the preset bit width and the original bit width.

15. A non-transitory computer-readable storage medium having stored thereon instructions that, when executed by a processor, cause the processor to perform the audio data transmission method of claim 7.

16. The non-transitory computer-readable storage medium of claim 15, wherein the instructions further cause the processor to receive 1 bit of the processed audio data in each cycle of the second clock signal, and complete reception of one frame of the processed audio data in each cycle of the first clock signal.

17. An audio data transmission apparatus, applied to a sending device, the apparatus comprising:
a processor; and
a memory configured to store instructions executable by the processor,
wherein the processor is configured to:
parse input audio data to be processed, and obtain, for the input audio data to be processed, a frequency of sampling, a number of slots and an original bit width of audio data of each slot;
determine the frequency of sampling as a clock frequency of a first clock signal;
determine a clock frequency of a second clock signal according to the clock frequency of the first clock signal, the number of slots and a preset bit width occupied by audio data;
determine a duration of a high level in each cycle of the first clock signal according to the clock frequency of the second clock signal and the number of slots; and
output processed audio data according to a pulse code modulation (PCM) timing determined by the clock frequency of the first clock signal, the clock frequency of the second clock signal and the duration of the high level in each cycle of the first clock signal.

18. The apparatus of claim 17, wherein to output the processed audio data according to the PCM timing determined by the clock frequency of the first clock signal, the clock frequency of the second clock signal and the duration of the high level in each cycle of the first clock signal, the processor is further configured to:
output 1 bit of the processed audio data in each cycle of the second clock signal, and complete output of one frame of the processed audio data in each cycle of the first clock signal.

19. The apparatus of claim 17, wherein the processor is further configured to:
perform data bit width conversion on the audio data having the original bit width for each slot in the input audio data to be processed according to a preset alignment manner and the preset bit width, and obtain the processed audio data,
wherein the original bit width is less than or equal to the preset bit width.

20. The apparatus of claim 19, wherein to perform the data bit width conversion on the audio data having the original bit width for each slot in the input audio data to be processed according to the preset alignment manner and the preset bit width and obtain the processed audio data, the processor is further configured to:
convert the audio data having the original bit width in each slot into audio data having the preset bit width using a left-alignment manner,
wherein the audio data having the preset bit width sequentially comprises, from left to right, valid audio data having the original bit width and complementing data having a remaining bit width, the remaining bit width being equal to a difference between the preset bit width and the original bit width.

\* \* \* \* \*